(12) United States Patent
Korpi

(10) Patent No.: US 6,444,927 B1
(45) Date of Patent: Sep. 3, 2002

(54) MICROBALANCE WITH REDUCED TEMPERATURE AND / OR PRESSURE SENSITIVITY

(76) Inventor: David Michael Korpi, 22642 Indian Springs Rd., Salinas, CA (US) 93908

(*) Notice: Subject to any disclaimer, the term of this patent is extended or adjusted under 35 U.S.C. 154(b) by 0 days.

(21) Appl. No.: 09/682,281

(22) Filed: Aug. 13, 2001

(51) Int. Cl.$^7$ .............................................. G01G 11/04
(52) U.S. Cl. ....................................... 177/210; 73/580
(58) Field of Search ...................... 73/580; 177/210 FP

(56) References Cited

U.S. PATENT DOCUMENTS

| | | | | |
|---|---|---|---|---|
| 3,926,271 A | * | 12/1975 | Patshnick ............... | 177/210 FP |
| 4,210,216 A | * | 7/1980 | Godden .................. | 177/134 |
| 4,294,105 A | * | 10/1981 | Kelly ..................... | 177/210 FP |
| 4,391,338 A | * | 7/1983 | Patashnick et al. .... | 177/210 FP |
| 4,666,005 A | * | 5/1987 | Komoto et al. ......... | 177/180 |
| 4,736,091 A | * | 4/1988 | Moe ....................... | 219/505 |
| 4,858,145 A | * | 8/1989 | Inoue et al. ........... | 177/210 FP |
| 5,753,792 A | * | 5/1998 | Olson ..................... | 177/25.18 |
| 6,080,939 A | * | 6/2000 | Hassel ................... | 177/210 FP |

* cited by examiner

Primary Examiner—Randy W. Gibson

(57) ABSTRACT

22A temperature and/or pressure compensated microbalance is disclosed. Temperature compensation is achieved by applying heat to at least a part of the microbalance, measuring a temperature-dependent variable, and controlling the amount of heat applied to the microbalance to keep the temperature-dependent variable substantially constant. In one embodiment, the heat is applied to the microbalance by passing electrical current through a resistive element provided on or embedded in the oscillating element of the microbalance. Pressure compensation is achieved by taking into account the variation in the mass or density of fluid passing through the microbalance. Various materials and methods of construction are also disclosed, including micromachining and electroforming.

8 Claims, 7 Drawing Sheets

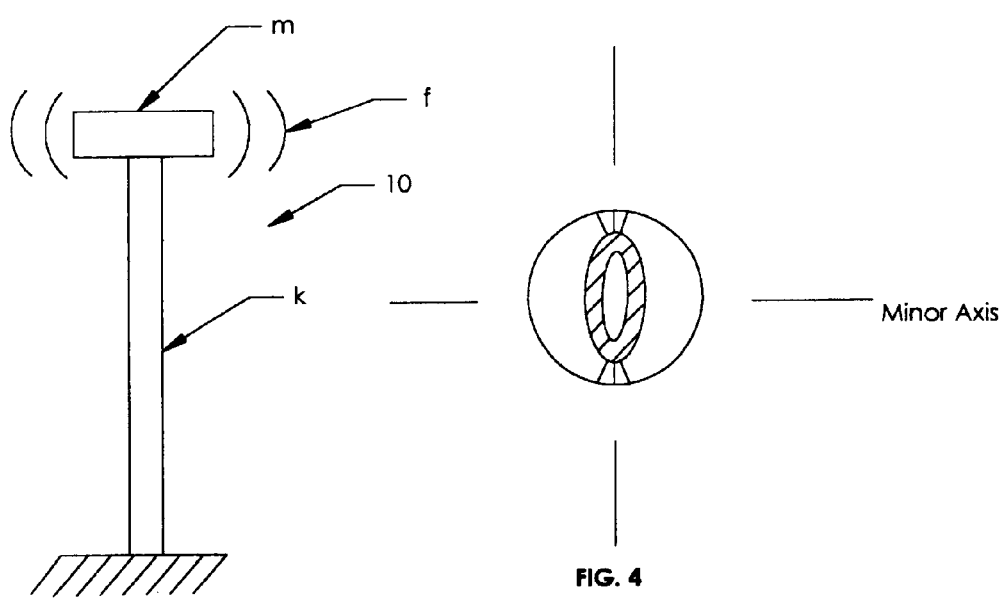
FIG. 1
FIG. 4
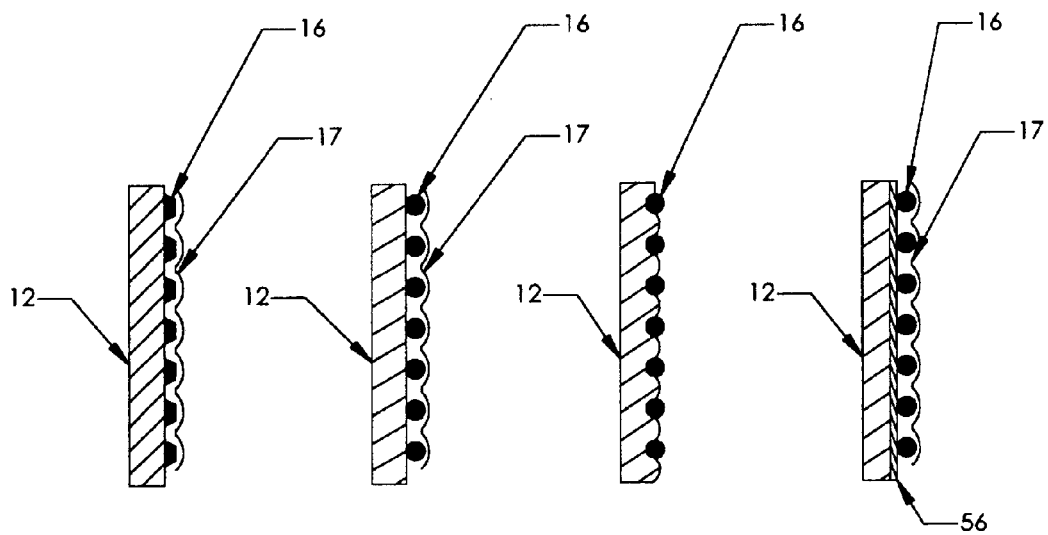
FIG. 5  FIG. 6  FIG. 7  FIG. 8

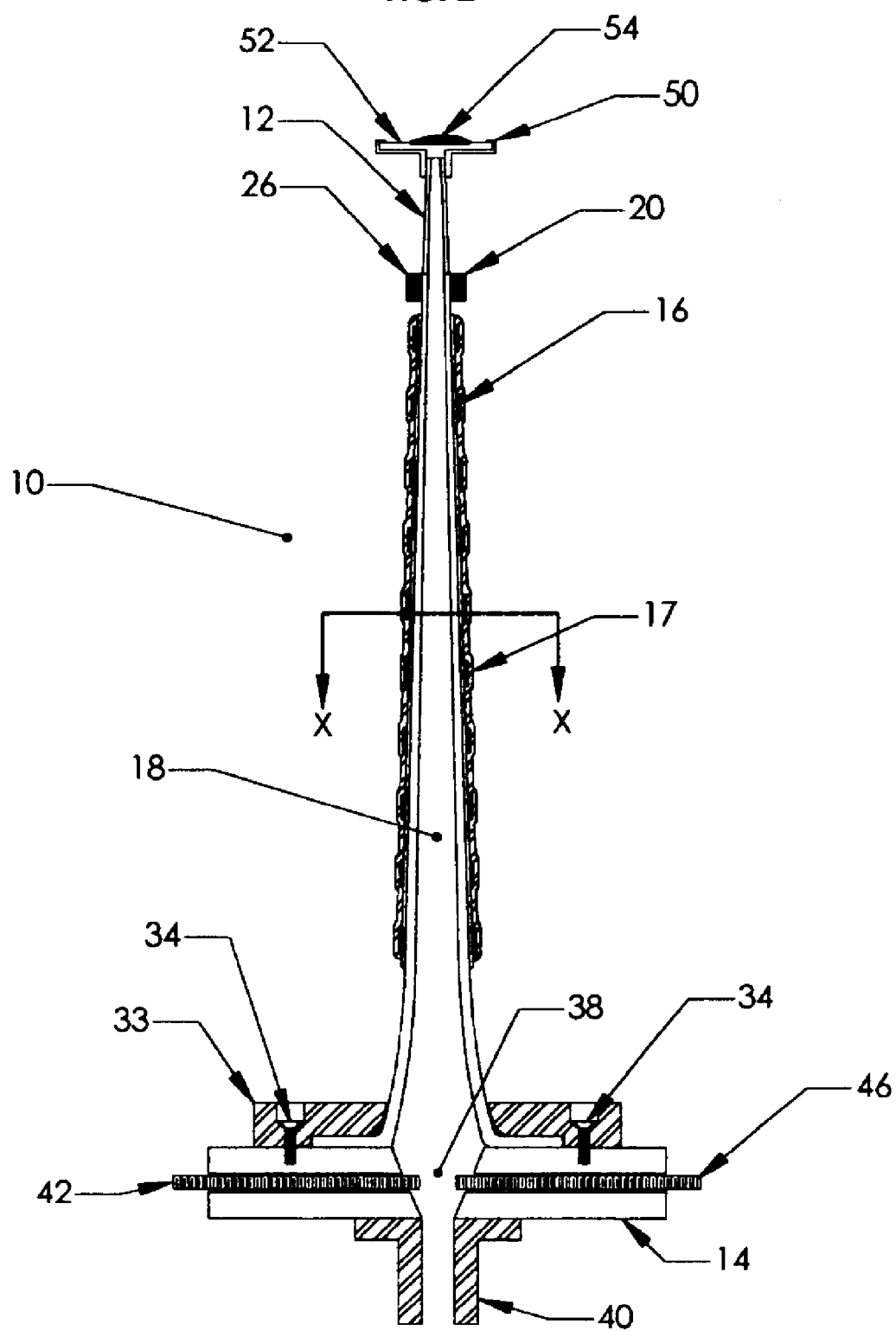

MICROBALANCE WITH REDUCED TEMPERATURE AND / OR PRESSURE SENSITIVITY

BACKGROUND OF INVENTION

Instruments used to measure a particular parameter may be affected by the variation of other parameters. For example, measurement of the mass of material deposited on a microbalance may be adversely affected by a variation in temperature or pressure.

A microbalance, examples of which are described in U.S. Pat. Nos. 3,926,271 and 4,391,338, typically comprises an oscillating element mounted with one end fixed and the other end free. The free end typically has a filter (or other mass-receiving element) mounted thereto. The oscillating element may also be hollow, and in such a case a fluid is typically drawn through the filter and through the oscillating element, thereby to trap suspended particles within the fluid in or on the filter. The resulting increase in the mass of the filter decreases a resonant frequency of the oscillating element. The decrease in the resonant frequency of the oscillating element is related to the increase in mass of the filter, which in turn is equal to the mass of the suspended particles trapped in the filter. Because the oscillating element has the ability to continually indicate the mass of the suspended particles it is ideal for indicating the change in mass of the trapped or suspended particles in near real time or over a measured period of time.

SUMMARY OF INVENTION

As the temperature of the microbalance's oscillating element changes, the resonant frequency of the oscillating element changes, even though the mass on the filter substrate secured to the oscillating element may remain unchanged. As the measured mass is based on the resonant frequency, an error is introduced in the mass determination. This temperature sensitivity results mainly from a change in the modulus of elasticity of the material, from which the oscillating element is made, as the temperature changes.

One way of addressing the concern of the temperature sensitivity of the microbalance, or other instrument, is to select a material of construction that has minimal sensitivity to changes in temperature. For a microbalance, great care can be applied to the formulation of the glass from which the oscillating element is made, thereby to attain the desired characteristics while attempting to optimize manufacturability and minimize the temperature sensitivity of the desired variables. In particular, one way of reducing the temperature sensitivity of the microbalance is to use a shaped oscillating element made of a glass having a low temperature coefficient of elastic modulus. In the end, compromises must be made at the expense of the accuracy, manufacturability and cost of the entire system.

According to one aspect of the invention, the temperature sensitivity of an instrument, for example the microbalance described above, is reduced by maintaining the instrument, or at least a temperature-sensitive element thereof, at a constant temperature. This is achieved by: applying heat to the instrument; measuring a parameter that is indicative of the temperature of the instrument; and controlling the amount of heat applied to the instrument to maintain the measured parameter substantially constant.

For example, this control may be accomplished by affixing a resistive heater on the oscillating element of the microbalance. The resistive heater can be wound onto the oscillating element, vacuum deposited, or applied by any other means. Some glass formulations allow embedding platinum heater windings directly within the glass. Radiant or other types of heating, such as convective and conductive, can also be employed. A radiant heater would be positioned appropriately next to or around the oscillating element to provide heat thereto. The parameter that is used to control the amount of heat supplied to the heater can be the resistance of the heating element (which is dependent on the temperature), or the output of an appropriately positioned temperature sensor.

A further error in the use of microbalances having hollow oscillating elements is caused by temperature and/or pressure changes in the fluid located within the cavity of the hollow oscillating element. As the temperature or pressure of the fluid within the cavity of the hollow oscillating element varies, so will the density of the fluid. Assuming that the interior volume of the cavity of the hollow oscillating element remains substantially constant, a variation in the density of the fluid will result in a variation of the mass of the fluid located in the cavity of the hollow oscillating element. That is, the effective mass of the oscillating element will vary with temperature and/or pressure changes in the fluid located therein. This variation in the effective mass of the oscillating element will in turn affect the resonant frequency of the oscillating element.

The pressure-dependent error frequently manifests itself as a perceived negative mass over time. As the filter element loads up with particulate or other forms of flow-impeding elements, the pressure within the cavity of the hollow oscillating element will decrease due to the increased resistance of the filter element. As the pressure of the fluid decreases, so does the density, reducing the mass of the column of fluid within the cavity of the hollow oscillating element. This in turn will increase the resonant frequency of the oscillating element, indicating a false reduction in the mass of the filter element and its entrapped matter.

Similarly, if the fluid gets colder, the density of the fluid column in the cavity of the hollow oscillating element will increase, increasing the mass within the cavity of the hollow oscillating element. The resonant frequency of the oscillating element will be correspondingly lower, thereby indicating an erroneously high mass. The reverse is true if the fluid temperature increases.

The compensation for the variation in temperature or pressure can be performed as follows, using an idealized gas as a fluid, with Boyle's law (PV=nRT) to approximate the behavior of the gas. It will be appreciated that other models and equations can be used for performing the pressure/temperature/density compensation, and that other models and/or equations can be used to represent the dynamics of the instrument in question.

Referring to FIG. 1, the principle of operation of a microbalance 10 can be represented by $m=k/f^2$, where m is the mass in grams, f is the frequency in Hz, and k is the spring constant in $g*Hz^2$.

For a particular microbalance, the spring constant can be determined by using two values of m one for "zero" mass (i.e. the system mass only), and one for an additional mass added to the "zero" mass. The system mass is of course not actually zero—we "tare" the system mass out for purposes of convenience, much like a post office scale is zeroed before the letters are placed in a box on the scale. This ensures that the mass of the letters only is considered, and not the mass of the box.

The equation for the spring constant can be derived as follows: $k=(m_1 m_0)/(1/f_1^2 1/f_0^2)$ Using exemplary values of $m_1=0.075$g, $m_2=0$, $f_1=250$ Hz and $f=311.314$ Hz yields a value of $k=13.200$ g*Hz$^2$, obtained at a temperature of 20° C. and 29.92 inHg, with the fluid being an air mixture. At this temperature and pressure, the air mixture has a density of 1.200 g/l.

The actual system mass at this temperature can now be determined by substituting the determined value of k and the observed value of f for the "zero" mass condition. Using these two values, we arrive at a system mass of 0.136199 g. Part of this system mass results from the column of air in the cavity of the hollow oscillating element.

As mentioned, the mass at the "zero" condition (the system mass only) includes a mass component derived from the mass of the fluid column in the cavity of the hollow oscillating element at the particular fluid density. The effect of the fluid column on the system mass can be determined by measuring the "zero" or system mass at a different fluid density, as follows.

Repeating the test described above at a reduced air pressure of 20.00 inHg, the new density (from Boyle's law) is rho=$\text{rho}_1 P_1/P * T/T_1 = 0.8021$ g/l. The observed frequency at 20 inHg is 311.4 Hz, which indicates a mass of $m=k/f^2=$ 0.1361 24 g. This new system mass, and its associated change in frequency, have resulted from the decrease in the fluid density (and hence the mass of fluid in the cavity of the hollow oscillating element). The change in mass, delta_m= 0.136199 0.136124=0.000075 g, which has occurred as a result of a change of density, delta_rho, of 1.20 g/l 0.8021 g/l=0.3979 g/l.

The "active" volume, V, (i.e. the effective volume that contributes to the variation in the frequency) can be determined as follows:V=delta_m/delta_rho=0.000075/0.3979= 1.884896E-4 I.

Using the parameters determined above, a compensation for a variation in mass of the fluid column of the cavity of the hollow oscillating element can be performed. One exemplary way of doing this is to edit the basic equation $k=(m_1 m_0)/(1/f_1^2 1/f_0^2)$ to allow for the variation in the mass of the fluid column within the cavity of the hollow oscillating element. Each of the masses in this equation can be represented as a sum of the oscillating element mass and the fluid column mass. That is, $m_n = m_{nm} m_{nF}$, where $m_{nm}$ is the oscillating element mass and m is the fluid column effective mass or "active" mass. The effective mass can be determined by multiplying the density by the "active" volume, which is determined as shown above. Thus, $m_{1F}=V*\text{rho}_{1F}$. The variable $\text{rho}_{1f}$ is a function of $T_{1F}$ and $P_{1F}$ as follows:$\text{rho}_{1f}=\text{rho}_S * P_S/P_{1F} * T_{1F}/T_S$ Where the subscripts s refer to density, pressure and temperature at standard or reference conditions.

Substituting $\text{rho}_{1F}$ into the equation for $m_{1F}$, we get:$m_{1F}=V*\text{rho}_S*P_S/P_{1F}*T_{1F}/T_S$ Similarly, $m_{0F}=V*\text{rho}_S*P_S/P_{0F}*T_{0F}/T_S$ Therefore, $m_1-m=(m_{1m}+V*\text{rho}_S*P_S/P_{1f}*T_{1f}/T_S)$ $(m_{0m}+V*\text{rho}_S*P_S/P_{0F}*T_{0F}/T_S)m_1-m_0=(m_{1m} m_{0m})+$ $V*\text{rho}_S*P_S/T_S*(T_{1F}/P_{1F}-T_{0F}P_{0F})$We now substitute these mass equations into a rearranged $k=(m_1 m_0)/(1/f_1^2 1/f_0^2)$, as follows:$(m_1 m_0)=k$ $(1/f_1^2 1/f_0^2)(m_{1m} m_{0m})+V*\text{rho}_S*P_S/T_S*$ $(T_{1F}/P_{1F}-T_{0F}/P_{0F})=k(1/f_1^2/1f_0^2)m_{1m}=m_{0m}+k(1/f_1\ ^2 1/f_0^2)$ $V*\text{rho}_S*P_S/T_S*(T_{1F}/P_{0f}/P_{0F})$Comparing this to the original equation, we can see that the term $V*\text{rho}_S*P_S/T_S*(T_{1f}/P_{1F}-T_{0F}/P_{0F})$ provides the compensation for the variation in temperature/pressure/density of the fluid column in the cavity of the hollow oscillating element. If the pressure and temperature remain unchanged, the term $(T_{1f}/P_{1f}-T_{0f}/P_{0f}=0$, and the equation reverts to the original equation of $m_{1m}= m_{0m}+k\ (1/f_1^2 1/f_0^2)$.

But if the temperature and/or pressure vary, this term will provide an adjustment.

In the practical application of the invention, $T_{1F}$, $P_{1F}$, $T_{0F}$, $P_{0F}$, $f_1$, $f_0$ are observed using appropriate sensors as will be described in more detail below. The spring constant k is determined along with a known mass at conditions $P_{0f}$ and $T_{0F}$. The resulting observed $f_0$ allows for the calculation of k.

BRIEF DESCRIPTION OF DRAWINGS

Exemplary embodiments of the invention will now be described with reference to the attached drawings, in which;

FIG. 1 is a side view of an idealized microbalance for illustrating the principles of operation thereof;

FIG. 2 is a sectional side view of a microbalance in accordance with the present invention that is made utilizing an electroforming fabrication process;

FIG. 4 is a sectional view of the microbalance through the plane X—X shown in FIG. 2 and FIG. 3;

FIG. 5 is a sectional view of the wall of the microbalance of FIG. 3 showing one configuration of the heating elements used to provide temperature control;

FIG. 6 is a sectional view of the wall of the microbalance of FIG. 3 showing an alternative configuration of the heating elements used to provide temperature control;

FIG. 7 is a sectional view of the wall of the microbalance of FIG. 3 showing an alternative configuration of the heating elements used to provide temperature control;

FIG. 8 is a sectional view of the wall of the microbalance of FIG. 2 showing an alternative configuration of the heating elements used to provide temperature control;

DETAILED DESCRIPTION

Figure 3:
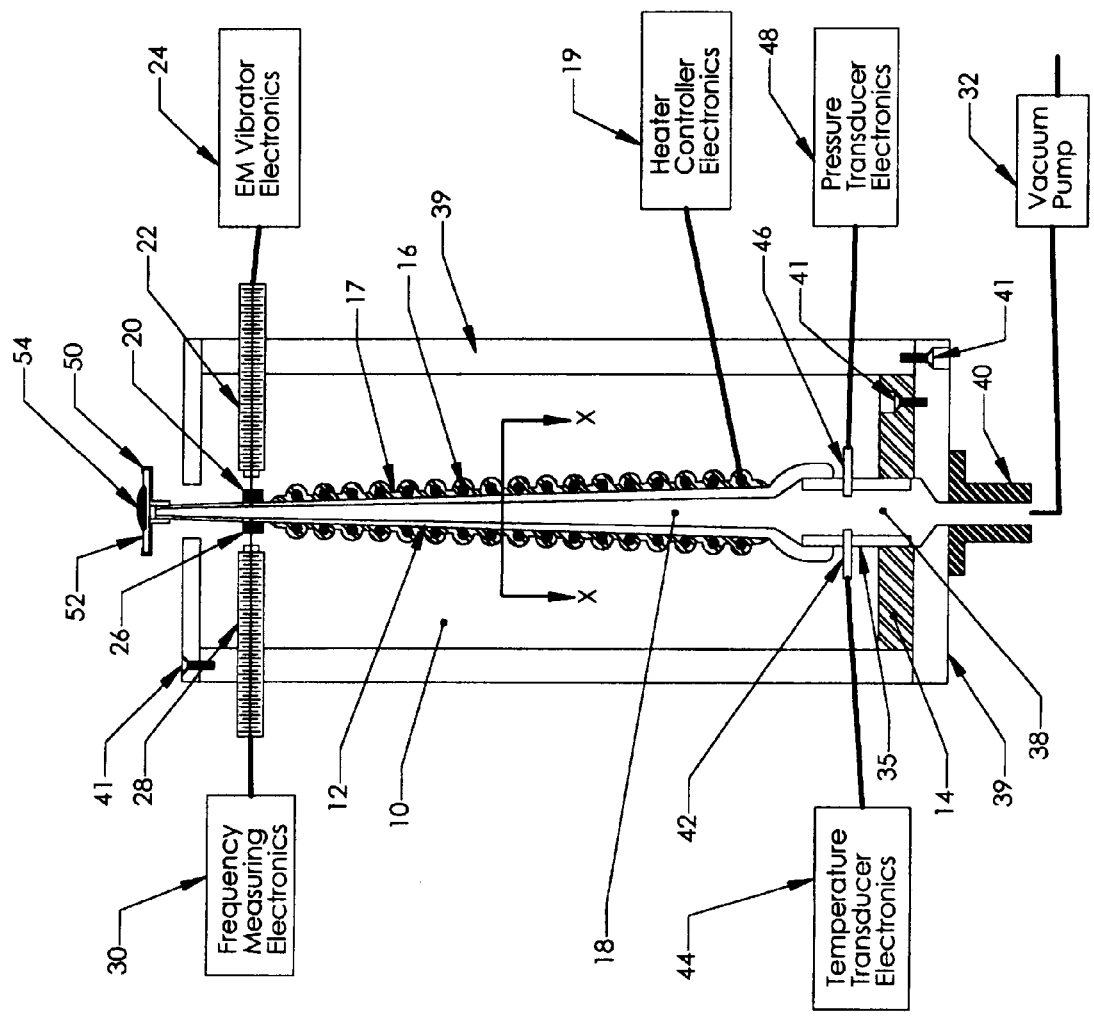
FIG. 3 is sectional side view of a microbalance in accordance with the present invention, that is made utilizing a glass fabrication process, showing an exemplary installation and related equipment.

Referring now to FIGS. 2 and 3, a microbalance 10 comprises an elastic oscillating element 12, a base 14 and a resistive heater 16.

The oscillating element 12 may be made of known materials used in the manufacture of microbalances, but it may also be made of other materials such as nickel alloys, inconel, quartz, and quartz-glass alloys. For example, a nickel-cobalt alloy may be used for increased strength and decreased temperature coefficient of elasticity. By applying the temperature compensation described herein, it is possible to use materials with less-restricted temperature dependencies of the modulus of elasticity, since the invention reduces the sensitivity of the instrument to external temperature variations.

Additionally, the oscillating element 12 may be manufactured using the electroforming manufacturing method. The electroforming method is similar to the method utilized for chrome plating automobile bumpers except that an appropriately shaped form is used on which to plate the material. The use of electroforming materials from which to make the oscillating element 12 will inherently result in a lower temperature dependence over the normal operating temperature range of the system than many of the glass compositions available, since the Young's modulus of elasticity of the electroforming materials is typically a few orders of magnitude larger than the glass compositions available. Additionally, oscillating elements made from an electroformed material will be more rugged than glass elements, potentially lending the subject device to wider use.

The resistive heater 16 is wound around, or affixed to, the oscillating element 12, and is coupled to heater control electronics 19 as shown in FIG. 3. The resistive heater 16 may be covered with an insulating material 17, or may be embedded in the oscillating element 12. Further alternative configurations of the resistive heater 16 are described below with reference to FIGS. 5 to 8. In use, the heater control electronics applies a current to the resistive heater, thereby to apply heat to the oscillating element 12. The heater control electronics 19 also measures the resistance of the resistive heater, and controls the current applied to the resistive heater 16 to maintain the resistance thereof substantially constant. The resistance of the resistive heater 16 is a measure of the temperature of the resistive heater, and so by maintaining the resistance constant, the temperature of the resistive heater is held substantially constant. Of course, other temperature-dependent variables could be used to control the temperature of the oscillating element 12 of the microbalance 10. For example, the output of an appropriately positioned temperature sensor could be used.

The oscillating element 12 is mounted at one end thereof to the base 14, and the other end thereof is free to vibrate. As can be seen in FIG. 4, the oscillating element 12 has an elliptical cross-section in the illustrated embodiment, but other cross-sections may be used. The elliptical cross section results in the primary/lowest resonant frequency of the oscillating element 12 being in a predictable path, that is, along the minor axis. The means for exciting the oscillating element 12, and for measuring the resulting vibration, are accordingly also located along the minor axis of the ellipse.

Mounted towards the upper end of the oscillating element 12 is a disc 20 of magnetic or iron alloy material that is used to couple the excitation force to the oscillating element 12 when acted upon by an electromagnet 22 (FIG. 3) under control of EM vibrator electronics 24. Mounted to the oscillating element 12 opposite to the disc 20 is a magnetic or iron alloy disc 26 (typically the same as disc 20) that under vibration of the oscillating element 12 causes a fluctuation in the magnetic field in an electromagnet, or position sensing transducer, 28, which is detected by frequency measuring electronics 30. As the name suggests, the frequency measuring electronics 30 measure the resonant frequency of the oscillating element 12 of the microbalance 10. It will of course be appreciated that other structures and methods may be used for exciting the oscillating element 12 and for measuring the resonant frequency of the oscillating element 12 of the microbalance 10. For example, optical devices and methods may be used to measure the frequency of the oscillating element 12 of the microbalance 10.

The oscillating element 12 is hollow, with a cavity 18 defined therethrough. In use, a fluid is drawn through the oscillating element from the free end to the fixed end, and out through a passage defined in the base 14. As can be seen from FIG. 3, this fluid flow is generated by a vacuum supply or pump 32 that is in fluid communication with the cavity 18.

The electroformed oscillating element 12 of FIG. 2 is mounted to the base 14 by means of a number of screw fasteners 34 that clamp a lower flange of the oscillating element 12 to the base 14 via a ring 33. An O-ring 36 ensures a fluid-tight seal between the oscillating element 12 and the base 14.

The glass oscillating element 12 of FIG. 3 is mounted to the base 14 by means of an adapter 35. Surrounding the oscillating element of FIG. 3 is a housing 39 that is held together and to the base 14 by a number of screw fasteners 41. A similar housing (not shown) is provided in use for the microbalance 10 of FIG. 2.

The mounting configuration of FIG. 2 differs from the mounting configuration of FIG. 3 because the oscillating element 12 of FIG. 2 is a metallic electroformed part (see further below) while the oscillating element 12 of FIG. 3 is made of a quartz glass or a quartz alloy. The temperature coefficient of expansion of the quartz glass or quartz alloy is typically different from the temperature coefficient of expansion of the base 14, which can cause breakage of a quartz glass/alloy oscillating element 12 under temperature variation. To reduce the effects of this thermal mismatch, the oscillating element 12 of FIG. 3 is coupled to the base using the adapter 35, that is made of Kovar or other material that has a similar temperature coefficient of expansion as the quartz glass/alloy oscillating element 12.

Referring again to both FIGS. 2 and 3, the base 14 has a bore 38 defined therethrough, and a connector 40 that provides a connection to which the vacuum supply or pump 32 can be connected. A temperature transducer 42 is mounted in the base with its sensitive element in communication with the bore 38. The temperature sensor 42 in conjunction with temperature transducer electronics 44 is used to determine the temperature of the fluid in the bore 38. Similarly, a pressure transducer 46 and associated pressure transducer electronics 48 are used to determine the pressure of the fluid in the cavity 18 defined by the interior of the hollow oscillating element 12.

In use, a filter holder 50 is mounted to the free end of the oscillating element 12. The filter holder 50 provides a fixture for positioning a replaceable filter 52 so that the fluid that is drawn into the oscillating element 12 passes through the filter 52. As the fluid is drawn through the filter, particulate matter 54 in the fluid becomes trapped in or on the filter 52. It is the measurement mass of the particulate matter 54 trapped by filter that is the purpose of the microbalance 10. It can be appreciated that the filter 52 must be firmly affixed to filter holder 50 to prevent the filter 52 from moving relatively to the filter holder 50. This can be accomplished by securing the two elements together with any appropriate securing means (e.g. glue, epoxy or ultrasonic welding) compatible with the specific application.

FIGS. 5 to 8 show enlarged views of exemplary alternative configurations of the resistive element 16.

FIG. 5 shows a mechanically or electrochemically deposited resistive element 16 with an insulating material 17. The resistive element 16 can be applied using chemical vapor deposition or any suitable plating process appropriate for the selected materials of construction. The insulating material 17 can be any suitable material, but may for example be an ML epoxy applied by spraying or with a paint brush, a Pyralene PVD (physical vapor deposition) insulating material, or a titanium carbo-nitride layer deposited by chemical vapor deposition. FIG. 6 shows a mechanically wound resistive element 16 with insulating material 17.

FIG. 7 shows a resistive element 16 that is mechanically wound while the glass from which the oscillating element 12 is made is heated to the soft working temperature of the glass. The resistive element can also be heated by running current through it to facilitate embedding. This embeds the resistive element 16 in the oscillating element 12 and thereby eliminates the need for the insulation shown in FIG. 5, FIG. 6, and FIG. 8. Embedding the resistive element in this way provides good thermal contact between the resistive element 16 and oscillating element 12.

FIG. 8 shows a cross section of a metallic electroformed oscillating element 12. As the element is fabricated of a electrically conductive material, it is necessary to provide an insulation layer 56 that prevents shorting of the resistive element 16 to the oscillating element 12. The insulation layer 56 can be applied by any chemical plating method. The insulating layer 56 can be any suitable material, but may for example be an ML epoxy applied by spraying or with a paint brush, a Pyralene PVD (physical vapor deposition) insulating material, or a titanium carbo-nitride layer deposited by chemical vapor deposition. The resistive element 16 may be mechanically wound or using chemical vapor deposition or any suitable plating process, such as three dimensional photolithography, appropriate for the selected materials of construction. The insulating material 17 can be any suitable material, but may for example be an ML epoxy applied by spraying or with a paint brush, a Pyralene PVD (physical vapor deposition) insulating material, or a titanium carbo-nitride layer deposited by chemical vapor deposition. When electroformed, a suitable form is provided. The form can, for example, be injection molded using appropriately designed injection-molding tooling. The form can be made of a plastic such as PVC, a nylon or similar plastic, or even an injection molded or cast metal. As electroforming requires the form to be electrically conductive, plastic forms are typically coated with aluminum or silver utilizing methods similar to coating model car parts such as bumpers, such as electrolysis or electroplating processes. The form can however be made using any suitable manufacturing method (e.g. 4 axis machining, travelling wire EDM) or material.

The form typically defines the interior profile of the oscillating element 12. The oscillating element 12 is formed on the outside of the form, using conventional electroforming methods. When the oscillating element 12 has been formed, it is removed from the form, for example using a jack-screw assembly, where the jack-screw engages the plated and non-plated parts to jack them apart, or by using a chemical solution (e.g. a caustic soda solution) to dissolve the coating on the form or the entire form itself.

Figure 9:
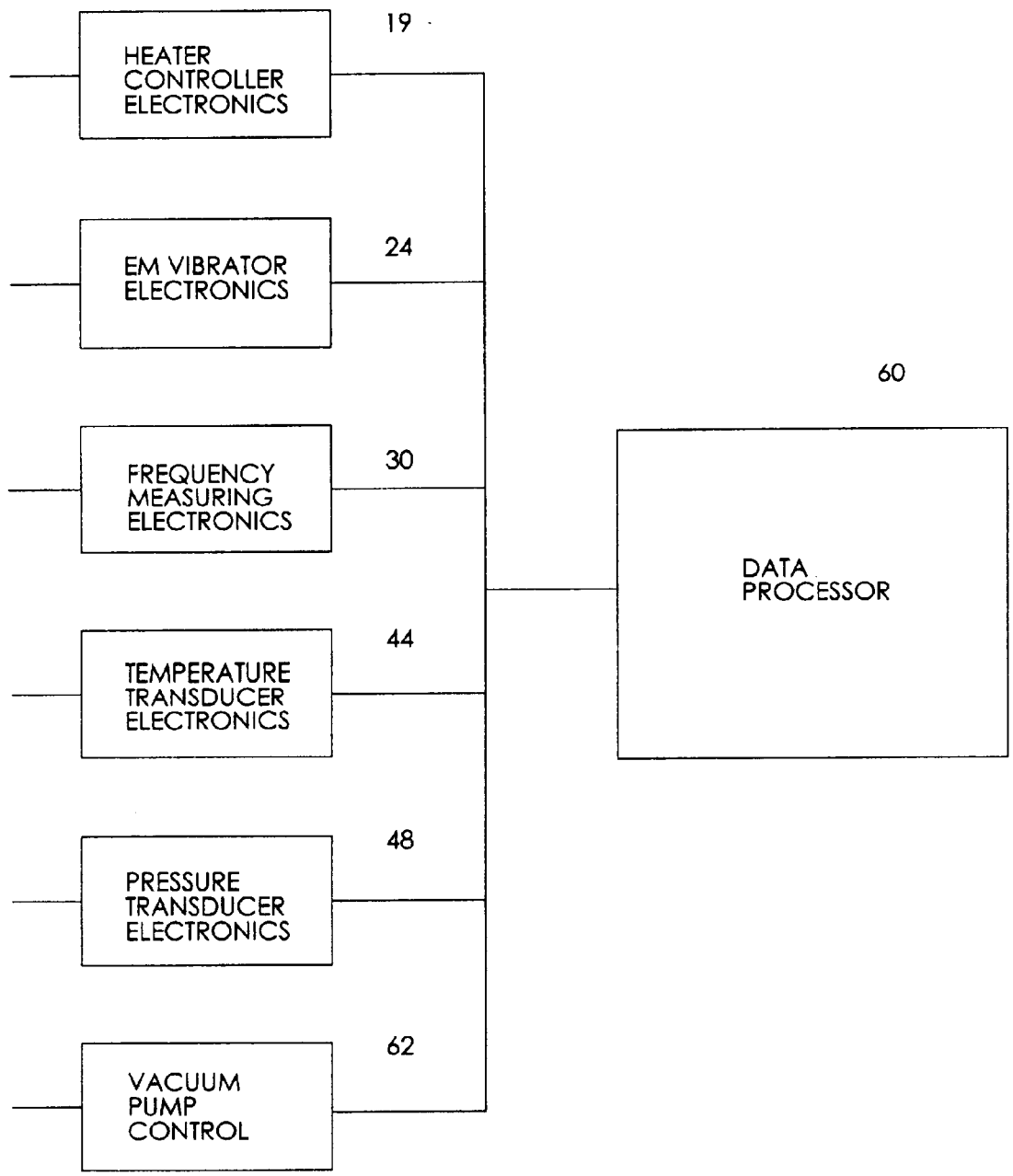
FIG. 9 is a schematic view of a data processor and related components for use with the microbalances of FIGS. 1 to 8, 10, 11, and 12.

FIG. 9 shows an exemplary data-processing configuration that may be used with the microbalance described above. As can be seen from the figure, a data processor 60 can be provided to receive information from and/or to control the various control electronics described above, as well as vacuum pump control electronics 62.

The data processor 60 may be a general-purpose computer or a dedicated microprocessor, or any other computing device having sufficient computing capabilities to operate the microbalance. It will also be appreciated that some or all of the control and computing functions shown separately in FIG. 9 may be integrated into one or more control or computing devices. Similarly, the particular interconnections between the devices may be varied, or may not be present at all. For example, the heater control electronics 19, the EM vibration electronics 24 and the vacuum pump control 62 may be freestanding units not connected to other units or the data processor 60. Similarly, when temperature control only is used, the pressure control electronics 48 may not be present at all. It will thus be appreciated that many configurations may be used in operation of the invention.

Referring now to the attached figures, in particular FIGS. 3 and 9, in use the heater control electronics 19 is actuated to provide electrical current to the resistive element 16 to heat the oscillating element 12. The heater control electronics monitors the resistance of the resistive element 16, and controls the amount of electrical current provided to the resistive element 16 to maintain the resistance of the resistive element 16 substantially constant. As mentioned above, the resistance of the resistive element 16 is dependent on its temperature, any by maintaining its resistance substantially constant, the temperature of the oscillating element 12 of the microbalance 10 is maintained substantially constant. Alternatively, the output of an appropriately located temperature sensor can be used to provide the feedback used to control the temperature of the oscillating element 12 of the microbalance 10.

The particular control temperature used varies according to the circumstances, but will typically be some amount (e.g. 5 to 10 degrees Celsius, or more) above the maximum expected ambient temperature that will be encountered by the microbalance, to ensure that the control of the temperature can be maintained. For example, a temperature of 50 degrees Celsius could be used for typical atmospheric conditions.

In an implementation where only the temperature of the microbalance is to be controlled (as opposed to also compensating for the variation in the mass of the fluid in the cavity of the hollow oscillating element 12 the oscillating element 12, of FIG. 3, is now excited using the EM vibration electronics 24 and electromagnet 22 to apply an excitation force to the disc 20. The frequency of the resulting vibration is measured by the frequency measuring electronics 30 using the signal generated in the electromagnet, or position sensing transducer, 28 by the movement of the disc 26. The vacuum pump 32 is then actuated, which reduces the fluid pressure in the oscillating element 12. This in turn draws fluid through the filter 52. As the fluid is drawn through the filter, particulate matter 54 is trapped thereby. The increased mass of the filter element results in a reduction of the resonant frequency of the oscillating element 12. As discussed in the Summary of the Invention, this change in resonant frequency is used to determine the mass of the particulate matter. This determination is typically done in the data processor 60 of FIG. 9.

If the density of the fluid is also to be compensated for (note, density compensation can also be done without temperature control), initial and subsequent pressure and temperature measurements are taken using the pressure transducer electronics 48 and pressure sensor 46 and the temperature transducer electronics 44 and temperature sensor 42. These measurements are then provided to the data processor 60, which compensates for the variation in density (mass) of the fluid in the cavity of the hollow oscillating element 12 as described above in the Summary of the Invention. As such it can be appreciated that an improved measurement of the change in mass may be achieved in near real time.

Hereinafter, the geometry and operational features and theory of the oscillating element described fully above shall be referred to as "subject oscillating element." Micro-machined pressure transducers and temperature transducers have been widely used since the late 1980's, even in toys and consumer products. Micro-machining is conventionally accomplished using tools similar to those utilized in semiconductor fabrication, and is accomplished by using masks, photoresist, ion-beam etching, X-ray photolithography, or other semiconductor fabrication techniques, to selectively etch away parts of a silicon wafer (or other equivalent base material) or add new structural layers, thereby to form the mechanical and electromechanical devices.

The use of micro-machining to manufacture polysilicon resonant microstructures is also known. Refer, for example, to a paper delivered at the IEEE Micro Electro Mechanical Systems Workshop, Salt Late City, Utah, Feb 20–22, 1989 entitled "Laterally Driven Polysilicon Resonant Microstructures" by William C. Tang, Tu-Chong H. Nguyen, and Roger T. Howe, University of California at Berkeley. Dept of Electrical Engineering and Computer Sciences, 1989. Hereinafter, said paper shall be referred to as "Resonant Microstructure Paper," the disclosure of which is incorporated herein by reference as if explicitly set forth. This paper describes the geometry of a structure, with modifications, that can accomplish essentially the same functionality as the subject oscillating element.

A micro-machined equivalent of the described subject oscillating element can be designed either as a "permanent, multi-use," "throw away" or "single use" device that encompasses all of the elements shown in FIG. 3 except for the electronics described in FIG. 9. The heater, pressure transducer, temperature transducer and of course the EM vibrating means and motion sensing (provided by the electrostatic comb drive and. sensing described in the Resonant Microstructure Paper) are included in the micro-machined device. The micro-machined version of the subject oscillating element would oscillate laterally, just like the subject oscillating element, except there would be no arc described in the micro-machined version because the micro-machined version is constrained to oscillate in a single plane compared to a typical 2" to 5" long oscillating element 12 shown in FIG. 3. The particulate matter would impact directly on the laterally resonating plate and indicate the change in mass over time using essentially the same transfer functions as those for the subject oscillating element. The operation of the micro-machined microbalance is substantially as described above for the microbalances manufactured using other techniques. Additionally, the micro-machined microbalance may also be operated without temperature or pressure compensation as appropriate.

Figure 10:
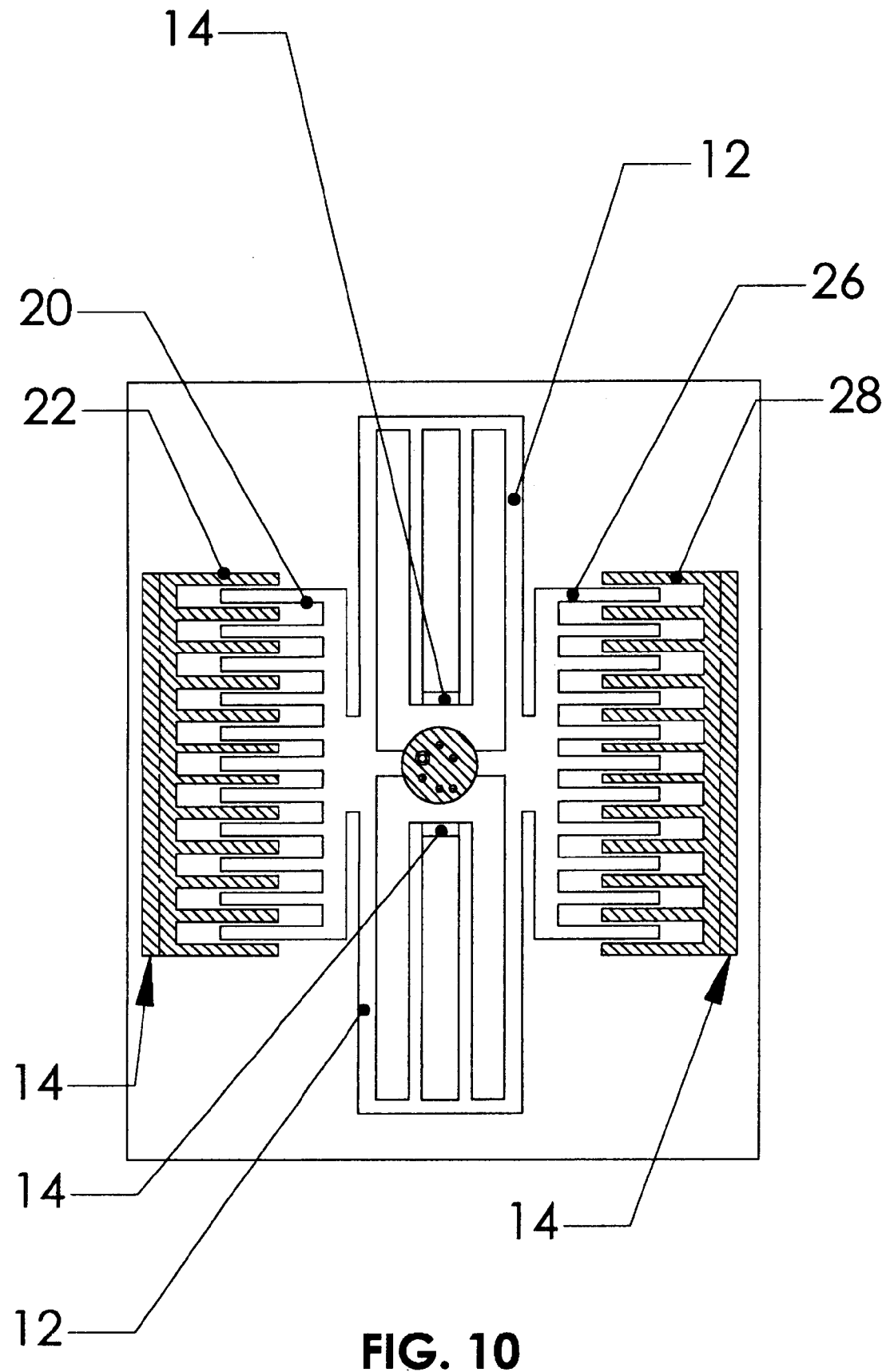
FIG. 10 is a layout of a micro-machined equivalent of the inner workings of the microbalance.
Figure 11:
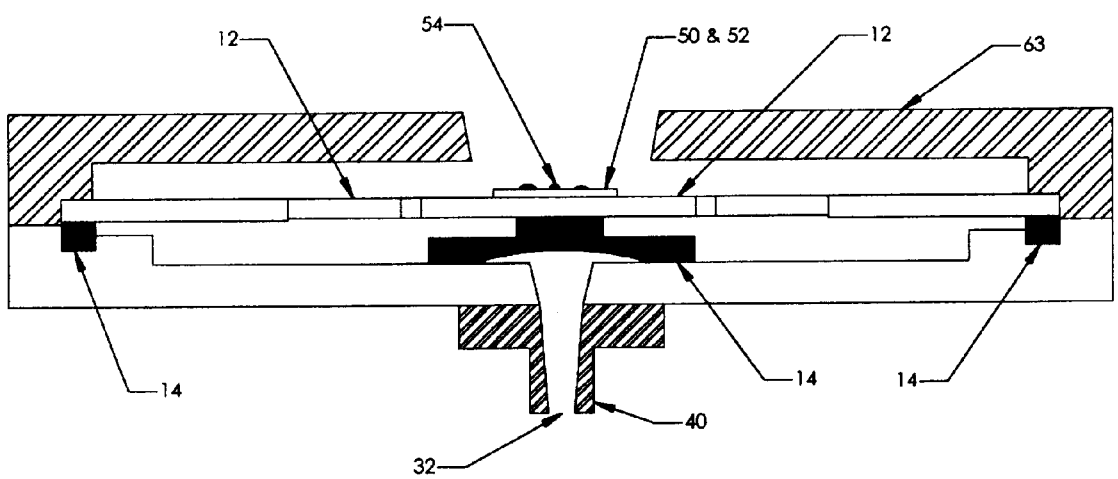
FIG. 11 is a sectional side view of the packaged micro-machined equivalent of the microbalance.
Figure 12:
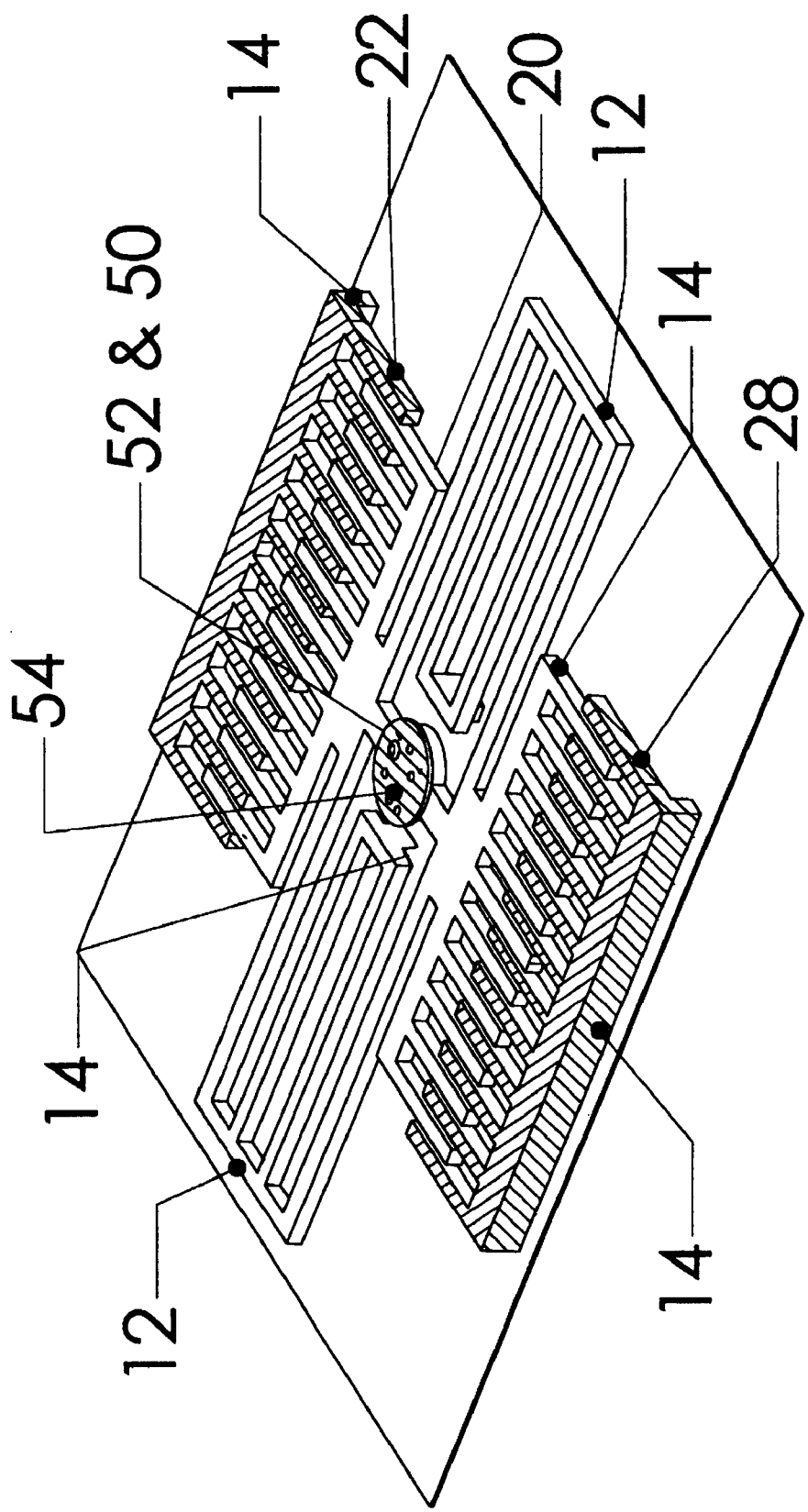
FIG. 12 shows an oblique view of the micro-machined microbalance to clarify the geometry of the microbalance.

FIG. 10 shows an exemplary version of the micro-machined equivalents for the subject oscillating element using the same numbering scheme as FIG. 3. Referring to FIGS. 10 to 12, the micro-machined microbalance comprises a base 14 that supports a dual folded beam suspension 12. The dual folded beam suspension 12 supports an impaction plate 50 (the equivalent of the filter holder and filter substrate). Alternatively, a filter substrate and a filter may be provided instead of the impaction plate. The dual folded beam suspension 12 is connected to comb structures 20 and 26. The dual folded beam suspension 12 is driven by the complementary comb structure 22 operating on the comb structure 20, and the movement of the dual folded beam suspension 12 is sensed by the complementary comb structures 26 and 28. The Resonant Microstructure Paper describes various additional drive and sensing means that may be implemented by those of ordinary skill in the art.

FIG. 11 shows an exemplary cross section of the micro-machined element in its package 63 with the dual folded beam suspension 12 connecting the impaction plate 50 and 52. As in the subject oscillating element we have connector 40 connected to the vacuum source or pump 32. The base(s) 14 are connected to the package 63 to define the complete assembly.

FIG. 12 shows an exemplary oblique view of the micro-machined element to clarify the similarities of this design to the subject oscillating element. We can see that the base 14 connects to the structure leaving the impaction plate 50 52 free to oscillate on the dual folded beam suspension 12, the equivalent of the subject oscillating element item 12, driven by the electrostatic comb drive at 22 and measured by measuring the capacitance using a dc bias and: measuring the short-circuit current through the time-varying comb structure at 28 through the movement of the comb structure at 26.

As one example of the fabrication process for micro-machining the necessary geometry for a micro-machined version of subject oscillating element can be accomplished using the four-mask process described in the Resonant Microstructure Paper, adapted as necessary. An advantage of the described four-mask process is that all the critical features are defined with one mask, eliminating the errors due to mask-to-mask misalignment. This four-mask process is used in the vast majority of micro-machined elements.

The fabrication process begins with the deposition standard $POCL_3$ blanket n+diffusion. Next we deposit an LPCVD (Low Pressure Chemical Vapor Deposition) silicon nitride ($Si_3N_4$) layer. The first mask defines the contact windows, which are etched using a combination of plasma and wet etching. The first Polysilicon layer is then deposited using LPCVD. This layer is masked with the second mask and etched to provide interconnection to the n+diffusion, standoff bumps are defined to prevent suspended micro elements from sticking. An LPCVD layer is then deposited as a sacrificial phosphosilicate glass (PSG) layer that will be removed to create the necessary cavities that define the essence of why micro-machining has gained wide use. The third mask defines the anchors for the microstructures. The next deposition is the LPCVD Polysilicon structural layer. We then dope this layer with PSG to dope the polysilicon symmetrically from the top and the bottom layers of PSG. We then stress anneal the entire structure at a temperature lower than 1100° C. to avoid loss of adhesion between the PSG and the silicon nitride ($Si_3N_4$). This entire PSG layer is then removed by etching leaving the second structural Polysilicon layer exposed for the final fourth mask. The structures are achieved in an anisotropically patterned in a $CCl_4$ plasma by reactive ion etching process in order to achieve nearly vertical sidewalls. Lastly, the sacrificial PSG is etched away revealing the final "floating" or "tunneled" geometry necessary for the micro-machined element. Refer to FIG. 4 of the Resonant Microstructure Paper for drawings of this surface micro-machining technology. Once the structure is sealed appropriate packaging can be employed to allow connection to a vacuum source.

There are clearly a variety of modifications that could be made to the above-described invention without departing from its essential principles. It is intended that all such modifications be encompassed within the scope of the following claims.

What is claimed is:

1. A method of reducing the temperature sensitivity of a microbalance including an elongated elastic element being coupled at one end thereof to a base with the other end thereof being free to oscillate, comprising the steps of:

applying heat to the elongated elastic element by means of an element that is provided on a surface of the elongated elastic element, embedded in the elongated elastic element, or partially embedded in the elongated elastic element;

measuring a parameter that is indicative of the temperature of the elongated elastic element; and controlling the amount of heat applied to the elongated elastic element to maintain the measured parameter substantially constant.

2. The method of claim 1 wherein the parameter is the resistance of the element.

3. The method of claim 1 wherein the parameter is the output of a temperature measuring device.

4. A microbalance comprising:

a base;

an oscillating element coupled at one end thereof to the base; and an element to apply heat to the oscillating element, wherein the element is: provided on a surface of the oscillating element; embedded in the oscillating element; or partially embedded in the oscillating element.

5. The microbalance of claim 4 further comprising control electronics to measure a parameter that is representative of the temperature of the oscillating element, and to control the element to maintain the parameter substantially constant.

6. The microbalance of claim 5 wherein the parameter is the resistance of the element.

7. A method of operating a microbalance, the microbalance including a hollow oscillating element having a filter mounted at one end thereof, the method comprising:

inducing resonance in the oscillating element; passing a fluid through the filter and through the oscillating element;

measuring the resonant frequency of the oscillating element to determine the mass of material captured in or on the filter;

measuring a parameter of the fluid being drawn through the oscillating element; and, compensating for the variation in the resonant frequency that has resulted from the variation of the parameter.

8. The method of claim 7 wherein the parameter is selected from the group consisting of temperature, pressure, and density.

* * * * *